C. M. SPENCER.
Screw-Cutting Machine.
No. 223,255. Patented Jan. 6, 1880.
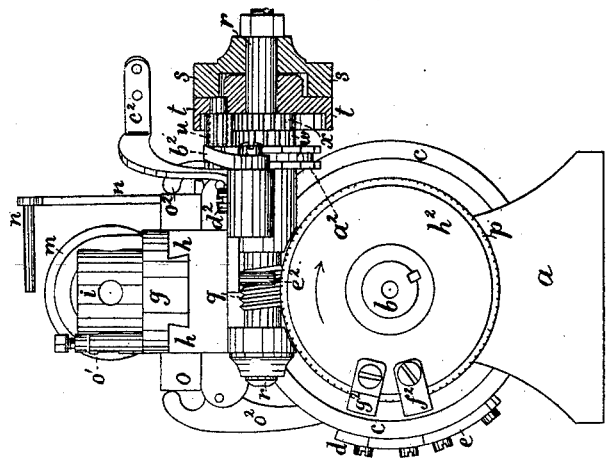
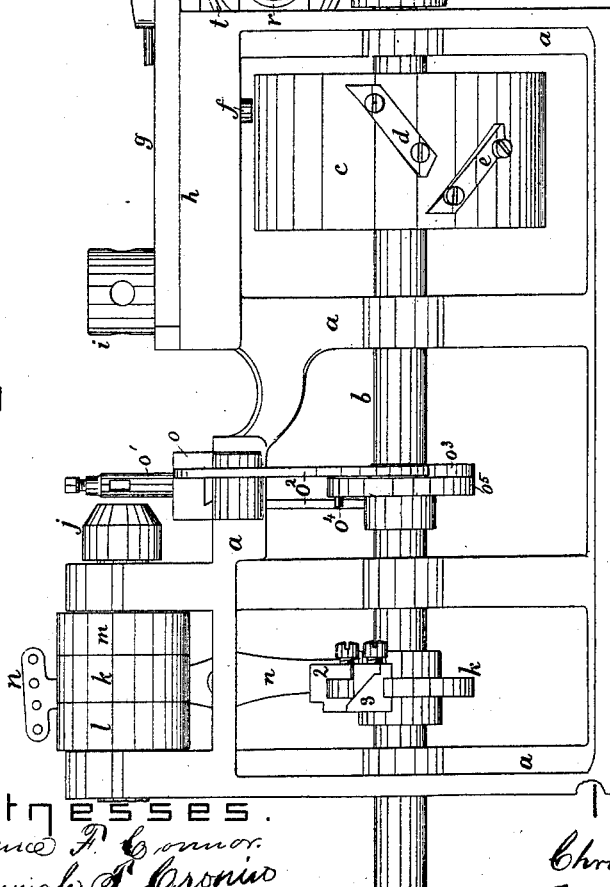
Witnesses.
Laurence F. Connor.
Jeremiah F. Cronin
Inventor.
Christopher M. Spencer
by Crosby & Gregory Attys

UNITED STATES PATENT OFFICE.

CHRISTOPHER M. SPENCER, OF HARTFORD, CONNECTICUT, ASSIGNOR TO THE HARTFORD MACHINE SCREW COMPANY, OF SAME PLACE.

SCREW-CUTTING MACHINE.

SPECIFICATION forming part of Letters Patent No. 223,255, dated January 6, 1880.

Application filed May 19, 1879.

*To all whom it may concern:*

Be it known that I, CHRISTOPHER M. SPENCER, of Hartford, county of Hartford, State of Connecticut, have invented an Improvement in Screw-Cutting Machines, of which the following description, in connection with the accompanying drawings, is a specification.

This invention relates to screw-cutting machines, and has for its object to increase the production of that class of machines having a reciprocating carriage and a revolving turret or tool-holder. This object is accomplished by adding to the said machine a speed-changing mechanism, whereby the carriage is moved forward at slow speed, the tool of the turret then operating upon the rod, after which the said carriage is moved backward at a much higher or increased rate of speed than that at which it was moved forward, the period of lost time of the machine, as when the tools are inoperative and the carriage is being retracted, or retracted and partially advanced, and the turret is being revolved, being thereby reduced to the minimum.

This invention is highly beneficial in that especial class of screw-cutting machines covered by United States Patent No. 143,306, September 30, 1873, heretofore granted to me, the said machines forming screws automatically from a long rod. In this present application it has been considered unnecessary to show more of a screw-cutting machine than will explain this present invention. In practice the increase in speed is sufficient to nearly double the product.

Figure 1 is a side elevation of a screw-cutting machine provided with these present improvements, and Fig. 2 an end view thereof.

The frame $a$, of usual shape, has a cam-shaft, $b$, on which is a hub or cylinder, $c$, provided, as usual, with cams $d$ $e$, which are to act upon the stud $f$ of the carriage $g$ fitted in guideways $h$ $h$, and reciprocate the said carriage longitudinally, causing its turret $i$, provided with one or more tools and revolved in any usual way, to, during the forward motion of the carriage, act upon the end of a rod to either reduce or cut a screw-thread upon its end.

The rod to be operated upon will be held in and revolved by the spindle $j$, having the usual fast pulley $k$ and the loose pulleys $l$ $m$, one having a crossed and the other a straight belt, to rotate the spindle in opposite directions alternately, to run the rod into and then out from the threading-die carried by the turret $i$, the said crossed and straight belts (not shown,) being placed under the control of a belt-shipper, $n$, acted upon at suitable intervals by the adjustable cams 2 3 on the wheel $k$.

The cross-slide $o$, carrying the part $o'$, which is to hold the usual cutting-off tool, is reciprocated by the levers $o^2$, acted upon by the cam $o^3$ and pin $o^4$, connected with disk $o^5$.

The cam-shaft $b$ carries the worm-toothed pinion $p$, which is engaged and rotated by the worm $q$ on the prime-motor shaft $r$, driven at its highest or fastest speed when the driving-belt is on the fast pulley $s$, which is the pulley occupied by the driving-belt during all the time that the carriage is being retracted, and also while it is being moved forward to place a tool of the turret $i$ in contact with the end of the rod to be operated upon, at which time the belt is suddenly shifted upon the loose pulley $t$ of the speed-changing mechanism, the said pulley and its connections operating to thereafter reduce the speed of the machine or shafts $r$ $b$, while the tool, which is then at the front of the turret, operates upon the rotating rod. This pulley $t$ is herein shown as a loose pulley, and it is provided with a stud, upon which is placed a small loose pinion, $u$, long enough to engage the teeth of two toothed gears, $w$ $x$, of equal diameter, the one, $x$, being fast on the shaft $r$, and having one tooth more than the toothed gear $w$, fast upon the ratchet-wheel $a^2$, loose on the said shaft $r$, the said ratchet-wheel $a^2$ being engaged by a pawl, $b^2$, which acts to prevent it from being moved in a direction contrary to the direction of rotation of the shaft $r$.

In practice, a proper reduction of speed is gained by providing gear $x$ with twenty-one teeth and gear $w$ with twenty teeth.

While the driving-belt is on the fast pulley $s$ and the shaft $r$ is being revolved to rotate the shaft $b$ at its highest speed, the loose pulley $t$, its small gear, and the gears $w$ $x$ and ratchet all move forward, together with the shaft $r$; but as soon as the driving-belt is shifted upon the loose pulley, that pulley immediately becomes the driver for the shafts $r$ and $b$.

The small pinion $u$, carried by the loose pulley and rotating about the gears $w$ $x$ in engagement with them, owing to the fact that the gear $x$, fast on the shaft $r$, has one more tooth than the gear $w$, held fast by the pawl and ratchet, moves the gear $x$ forward one tooth during each complete revolution of the pulley $t$, the speed of gear $x$ being thereby reduced to one-twentieth of that of pulley $t$, the slow speed of the machine prevailing during the time the tool of the turret on the forwardly-moving carriage is operating upon or is cutting a rod.

The belt for alternately driving these two pulleys $s$ $t$ is shifted at the proper times by a belt-shipper, $c^2$, pivoted at $d^2$, and provided with a pin or stud, $e^2$, which, at the proper time, is acted upon by the adjustable cams $f^2$ $g^2$ on the cam-carrying disk $h^2$, one or more cams $g^2$ shipping the belt upon the loose pulley $t$, and one or more cams $f^2$ shipping it upon the fast pulley $s$, the intervals between the times of shipping the said belt depending upon the time it is desired the fast or slow motion of the machine to be operative.

I claim—

1. In a screw-cutting machine, the combination, with the carriage and its tool-carrying turret and a shaft and cams to move the carriage, of a shaft and mechanism to automatically drive it and the cam-shaft at a slow speed while a tool of the turret is operating upon the end of a rod, and to thereafter drive it at a greater or higher rate of speed while the carriage is being retracted or the tools of the turret are inoperative, substantially as described.

2. In a screw-cutting machine, the cam-shaft $b$ and its disk and cams $f^2$ $g^2$, combined with a belt-shipper, to shift the belt from a fast to a loose pulley, and vice versa, on a shaft which drives the said cam-shaft, substantially as described.

3. In a screw-cutting machine, the shaft $r$, its loose ratchet-wheel and attached gear, and a pawl to hold the ratchet and a pulley and gear fast to the said shaft, combined with a pulley loose on the shaft and a pinion, $u$, carried by it, the pinion $u$ engaging both toothed gears, substantially as and for the purpose described.

In testimony whereof I have signed my name to this specification in the presence of two subscribing witnesses.

CHRISTOPHER M. SPENCER.

Witnesses:
G. W. GREGORY,
L. F. CONNOR.